US008108868B2

(12) United States Patent
Toub et al.

(10) Patent No.: US 8,108,868 B2
(45) Date of Patent: Jan. 31, 2012

(54) WORKFLOW EXECUTION PLANS THROUGH COMPLETION CONDITION CRITICAL PATH ANALYSIS

(75) Inventors: Stephen Toub, Seattle, WA (US); Dharma Shukla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1077 days.

(21) Appl. No.: 11/958,758

(22) Filed: Dec. 18, 2007

(65) Prior Publication Data

US 2009/0158289 A1 Jun. 18, 2009

(51) Int. Cl.
*G06F 9/46* (2006.01)
(52) U.S. Cl. ......... 718/103; 718/100; 718/102; 718/104
(58) Field of Classification Search .................. 718/100, 718/102, 103, 104
See application file for complete search history.

(56) References Cited

U.S. PATENT DOCUMENTS

| | | | |
|---|---|---|---|
| 6,463,582 B1 | 10/2002 | Lethin et al. | |
| 6,957,211 B1* | 10/2005 | Tyulenev et al. | 707/718 |
| 7,146,363 B2 | 12/2006 | Waas et al. | |
| 7,275,241 B2 | 9/2007 | Choi et al. | |
| 7,607,130 B2* | 10/2009 | Singh et al. | 718/100 |
| 7,665,093 B2* | 2/2010 | Maybee et al. | 718/106 |
| 2002/0056078 A1* | 5/2002 | Inagaki et al. | 717/155 |
| 2003/0149717 A1* | 8/2003 | Heinzman | 709/101 |
| 2004/0054997 A1* | 3/2004 | Katragadda et al. | 718/102 |
| 2005/0081206 A1 | 4/2005 | Armstrong et al. | |
| 2005/0222965 A1 | 10/2005 | Chaudhuri et al. | |
| 2006/0190430 A1 | 8/2006 | Luo et al. | |
| 2006/0241997 A1 | 10/2006 | Bhatawdekar et al. | |
| 2006/0288346 A1* | 12/2006 | Santos et al. | 718/102 |
| 2007/0011334 A1 | 1/2007 | Higgins et al. | |
| 2007/0022274 A1* | 1/2007 | Rosner et al. | 712/220 |
| 2007/0074217 A1 | 3/2007 | Rakvic et al. | |
| 2007/0208695 A1 | 9/2007 | Burger et al. | |
| 2007/0233969 A1* | 10/2007 | Shukla et al. | 711/150 |
| 2007/0239498 A1* | 10/2007 | Shukla et al. | 705/7 |

OTHER PUBLICATIONS

Tune et al, "Dynamic Prediction of Critical Path Intentions", 2001, In the proceedings of the 7th International Symposium on High Performance Computer Architecture, pp. 1-11.*
Diniz, Pedro, et al., "Dynamic Feedback: An Effective Technique for Adaptive Computing", 1997, 14 pages.
Tune, Eric, et al., "Dynamic Prediction of Critical Path Instructions", In Proceedings of the 7th International Symposium on High Performance Computer Architecture, Jan. 2001, 11 pages.

* cited by examiner

*Primary Examiner* — Emerson Puente
*Assistant Examiner* — Charles Swift
(74) *Attorney, Agent, or Firm* — Workman Nydegger

(57) ABSTRACT

Optimizing workflow execution. A method includes identifying a completion condition. The completion condition is specified as part of the overall workflow. The method further includes identifying a number of activities that could be executed to satisfy the completion condition. One or more activities from the number of activities is ordered into an execution plan and assigned system resources based on an analysis of activities in the number of activities and the completion condition.

21 Claims, 2 Drawing Sheets

WORKFLOW EXECUTION PLANS THROUGH COMPLETION CONDITION CRITICAL PATH ANALYSIS

BACKGROUND

BACKGROUND AND RELEVANT ART

Computers and computing systems have affected nearly every aspect of modern living. Computers are generally involved in work, recreation, healthcare, transportation, entertainment, household management, etc.

Some computing systems implement functionality by employing a workflow. A workflow executes activities. An activity is defined by a unit of executable code including one or more pulses of work. One of the ways an activity can execute one or more pulses of work is through the scheduling of child activities. A composite activity including a number of child activities enables custom control flows that can be implemented by scheduling child activities 0, 1 or n times as determined by the composite activity.

Generally workflows have child activities prescheduled as part of the workflow definition and simply execute the child activities in the order specified.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method which may be practiced in a computing environment including a workflow runtime. The method includes acts for optimizing workflow execution. The method includes identifying a completion condition. The completion condition is specified as part of the overall workflow. The method further includes identifying a number of activities that could be executed to satisfy the completion condition. One or more activities from the number of activities is ordered into an execution plan and assigned system resources based on an analysis of activities in the number of activities and the completion condition.

In another embodiment, a system including programmatic modules configured to optimize workflow execution may be implemented. The system includes a processor. The system further includes a computer readable memory medium storing computer executable instructions. The computer executable instructions include functional modules including an analysis module. The analysis module is configured to identify a completion condition. The completion condition is specified as part of an overall workflow. The analysis module is further configured to identify a number of activities that could be executed to satisfy the completion condition. The computer executable instructions further include a scheduling module configured to order one or more activities from the number of activities into an execution plan and assign system resources based on an analysis of activities in the number of activities and the completion condition.

Yet another embodiment includes a computer readable medium including computer executable instructions configured to optimize workflow execution. The computer readable medium includes computer executable instructions that when executed by a processor are configured to perform a critical path analysis based on one or more completion conditions for a workflow to identify an optimized set of activities that when executed would satisfy one or more of the completion conditions. The computer readable medium further includes computer executable instructions that when executed by a processor are configured to order the optimized set of activities into an execution plan and assign system resources based the execution plan.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may be implemented where a critical path is selected according to a critical path analysis such that selection and ordering of activities in a workflow and reservation of computing system resources to execute the activities can be optimized.

Figure 1:
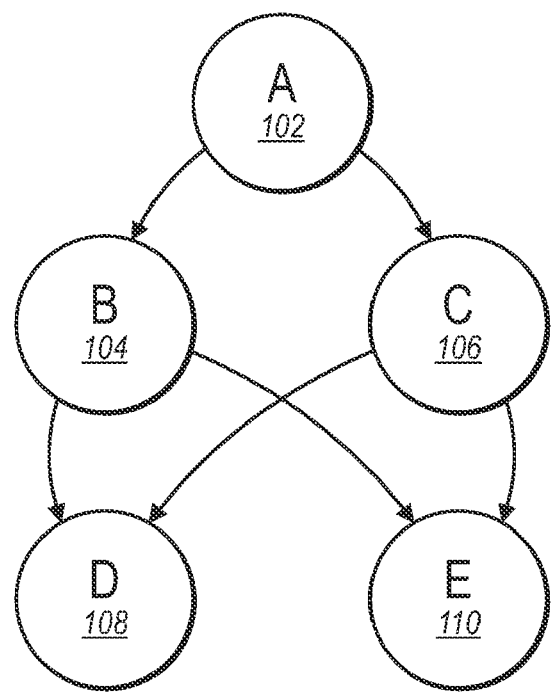
FIG. 1 illustrates possible execution plans for a workflow.
Figure 1:
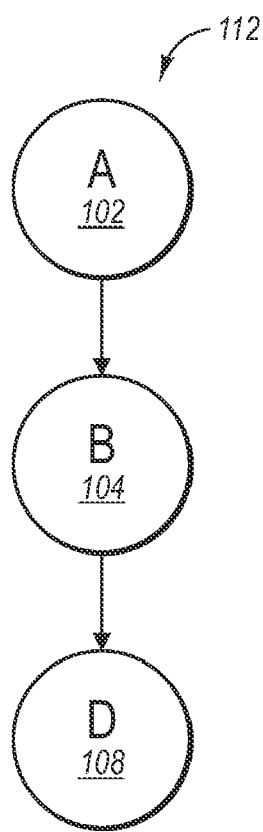

In some systems, for a workflow to complete processing, certain conditions should be met. For example, a computer program may specify that particular activities must have been executed. Notably, there may be some variability on what activities have been executed for the workflow to be considered as having completed processing. Reference is now made to FIG. 1 to illustrate an example of such a case. FIG. 1 illustrates a number of activities that may be executed in a workflow. In the example shown in FIG. 1, the program requires activities to be executed according to the following Boolean expression: A AND (B OR C) AND (D OR E). In other words, activity A 102 must execute, one of activities B 104 and C 106 must execute, and one of activities D 108 and E 110 must execute.

An analysis may be performed to optimize execution of activities. The analysis may be performed by software modules, computer hardware modules, or other appropriate systems. In particular, analysis may be provided by a scheduler module which orders activities and schedules system resources for the activities. Optimization does not necessarily select the most optimal activities for a workflow, but rather selects a set of activities that are more optimal than selection of at least one other set of activities. Illustrating now a concrete example, it may be determined that activity B 104 executes faster than activity C 106 and that activity D 108 executes faster than activity E 110. As such, a workflow may be optimized by selecting activities A, B, and D, for an execution plan 112 and scheduling those activities with system resources. Thus, an optimized set of activities is selected for the execution plan 112 to optimize the workflow.

Figure 2:
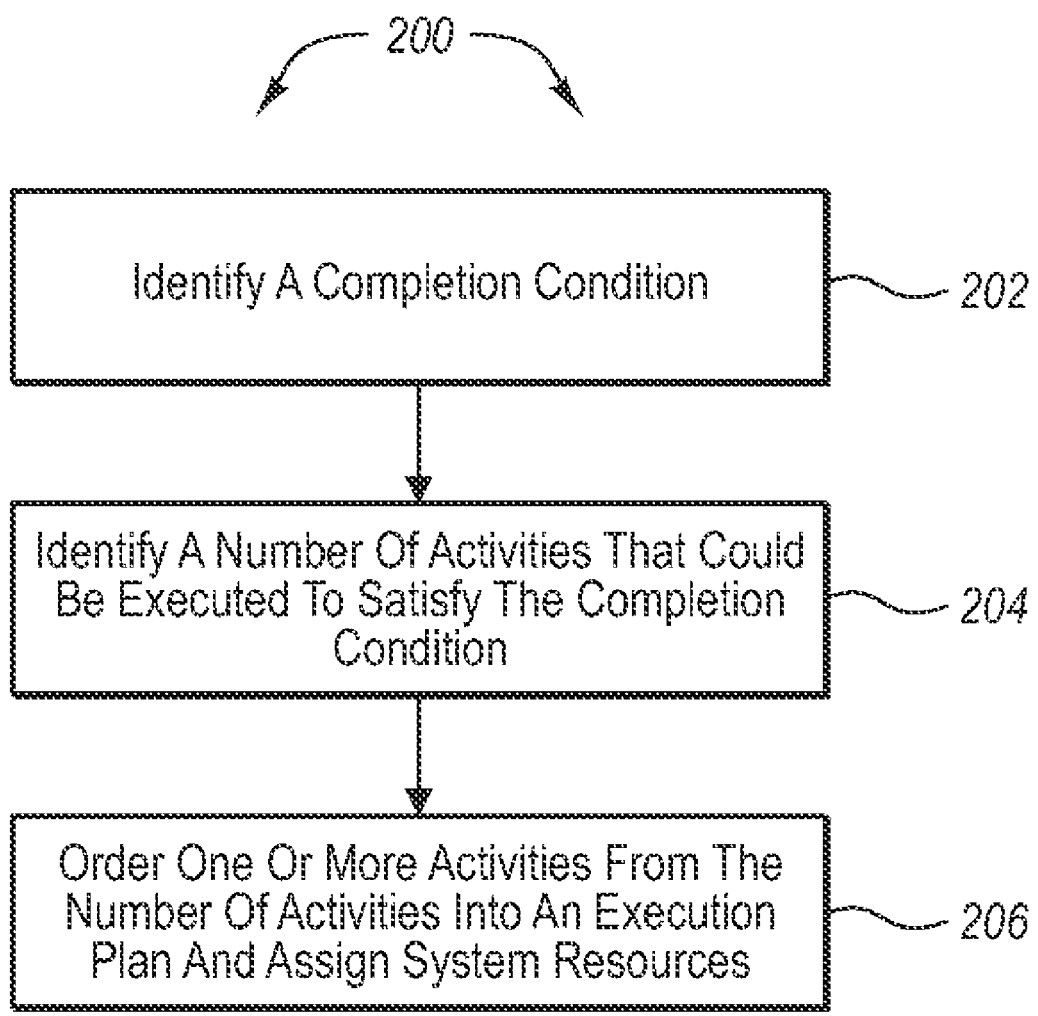
FIG. 2 illustrates a method of optimizing workflow execution.

Analysis and optimization may take into account a number of factors. These factors will be discussed in more detail in conjunction with the discussion of FIG. 2. Referring to FIG. 2, a method 200 is illustrated. Acts of the method 200 will now be discussed with examples of some of the acts illustrated using the workflow activities illustrated in FIG. 1. The method 200 may be practiced in a computing environment including a workflow runtime. The method includes acts for optimizing workflow execution. The method includes identifying a completion condition (act 202). The completion condition is specified as part of the overall workflow. Various completion conditions may be specified. For example a completion condition may specify that a given number of activities have executed. A completion condition may specify that a given percentage of activities have executed. A completion condition may specify that certain activities must execute while others are optional or alternatives. In some embodiments, such as in the example illustrated above in FIG. 1, the completion condition may be specified by a Boolean expression.

The method 200 may further include identifying a number of activities that could be executed to satisfy the completion condition (act 204). For example, the method 200 may include identifying activities based on the completion conditions so that the completion condition may be achieved.

The method 200 may further include ordering one or more activities from the number of activities and assigning system resources based on an analysis of activities in the number of activities and the completion condition (act 206). Various types of analysis may be performed. For example, in one embodiment, the method 200 may be performed such that an analysis of activities includes identifying a priority assigned by a developer. For example, a developer who created the workflow completion conditions or who programmed the activities may provide information indicating how activities execute. The developer information may include information such as an anticipated time for an activity to execute, performance of the activities when the activities execute with other activities, performance of activities when the activities execute with given system resources, such as system hardware, etc.

In some embodiments, the method 200 may be performed such that analysis of activities includes an analysis of system resources. For example, an analysis may be based on if hardware has been optimized for activities, or if activities have been optimized for hardware. If an activity executes more quickly or more efficiently with hardware presently in a system, the activity may be given a higher weight in an analysis, such that the activity is preferred over other activities. Additionally, in some embodiments, activities may be preferred or deemphasized based on system resources already assigned to other activities. For example, if an activity executes especially efficient when used with a particular resource, but that resource is already being used or has already been scheduled for other activities, then the activity may be weighted lower than some other activity that does not use the resource, but rather uses other resources that are available.

Embodiments of the method 200 may be implemented where an analysis of activities includes an analysis of activities in a workflow that have already executed. Illustratively, ordering and scheduling of activities can be a dynamic process that does not necessarily need to occur prior to any activities being executed. Rather, scheduling and ordering of activities can occur based on activities that have already executed. By using information from activities that have already executed, information can be obtained about how long a particular activity takes to execute, or what system resources an activity uses. This may be useful when activities are re-executed within a workflow.

An analysis of activities may include an analysis of feedback received from activities that have executed or are executing in a workflow. Illustratively, activities may include functionality for providing information regarding the status of an activity, percentage of completion of an activity, anticipated time to complete an activity, etc. This information can be provided as feedback to appropriate hardware or software modules responsible for ordering and scheduling activities.

Analysis of activities may include an estimation of time to execute one or more activities. This estimation may be based, for example on historical data, feedback from activity, a developer estimate, and the like.

As noted previously, ordering activities and assigning resources may include re-ordering previously ordered activities and reassigning previously assigned resources. This may include removing activities from a workflow schedule and possibly replacing removed activities with other activities.

In some embodiments, an analysis of activities may include an analysis of Boolean propositional satisfyability using activities that have already executed. For example, assume that in the example illustrated in FIG. 1, activities A 102 and B 104 have already executed. A Boolean propositional satisfyability analysis will reveal that the critical path must include either activity D or E. Further analysis can then be performed to determine which of the two activities should be ordered in a critical path and what system resources should be scheduled.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising a workflow runtime, a method for optimizing workflow execution, the method comprising:
    at one or more processors of a computing system, identifying a workflow that includes a plurality of activities, along with a completion condition defining one or more states of execution of the plurality of activities that represent completion of the workflow;
    at one or more processors of the computing system, prior to initially executing the workflow, developing an optimized execution plan for executing the workflow to achieve the completion condition, comprising:
        identifying the plurality of activities of the workflow that could be executed to satisfy the completion condition, the plurality of activities including a first activity and a second activity that could be alternatively executed to satisfy the completion condition, at least in part; and
        ordering one or more activities from the plurality of activities into the execution plan and assigning system resources to the one or more activities based on an analysis of the plurality of activities and the completion condition, including ordering the first activity into the exclusion plan to the exclusion of the second activity based on the analysis preferring the first activity over the second activity for satisfying the completion condition; and
    at one or more processors of the computing system, subsequent to developing the optimized execution plan, executing the workflow according to the execution plan.

2. The method of claim 1, wherein the analysis of the plurality of activities comprises identifying a priority assigned to each activity by a developer.

3. The method of claim 1, wherein the analysis of the plurality of activities comprises an analysis of system resources.

4. The method of claim 3, wherein the analysis of system resources comprises identifying that hardware optimized for a particular activity of the plurality of activities has already been assigned to another activity ordering the particular activity below at least one other activity in the execution plan based on the hardware being in use.

5. The method of claim 3, wherein the analysis of system resources comprises identifying a particular activity of the plurality of activities that is optimized for hardware present in the computing system and preferring the particular activity over at least one other activity when ordering the one or more activities into the execution plan based on the presence of the hardware.

6. The method of claim 1, further comprising:
    at one or more processors of the computing system, subsequent to executing the workflow, performing a subsequent analysis of the plurality of activities, the subsequent analysis of the plurality of activities comprising an analysis of at least one of the one or more activities in the execution plan that have already executed.

7. The method of claim 6, wherein the subsequent analysis of the plurality of activities comprises an analysis of execution feedback received from the at least one of the one or more activities in the execution plan that have already executed.

8. The method of claim 6, further comprising:
    at one or more processors of the computing system, in response to performing the subsequent analysis of the plurality of activities, re-ordering previously ordered activities in the execution plan and reassigning previously assigned resources.

9. The method of claim 8, wherein re-ordering previously ordered activities and reassigning previously assigned resources comprises removing a previously ordered activity from the execution plan and un-assigning resources associated with the activity.

10. The method of claim 6, wherein the subsequent analysis of the plurality of activities comprises an analysis of Boolean propositional satisfyability using activities already executed, and wherein the method further comprises, prior to executing the first activity, removing the first activity from the execution plan and ordering the second activity into the exclusion plan to the exclusion of the first activity.

11. The method of claim 6, wherein the subsequent analysis considers one or more of a number of activities executed or a percentage of activities executed.

12. The method of claim 1, wherein the analysis of the plurality of activities comprises an estimation of time to execute one or more of the plurality of activities.

13. The method of claim 12, wherein the estimation of time to execute one or more of the plurality of activities is based on historical data.

14. The method of claim 12, wherein the estimation of time to execute one or more activities is based on execution feedback from one or more activities.

15. The method of claim 12, wherein the estimation of time to execute one or more of the plurality of activities is based on developer estimate data provided by a developer of an activity.

16. In a computing environment comprising a workflow runtime, a system including programmatic modules configured to optimize workflow execution, the system comprising:
    a processor;
    a computer readable memory medium comprising computer executable instructions, the computer executable instruction comprising functional modules including:
        an analysis module configured to identify a workflow that includes a plurality of activities, and to identify a completion condition defining one or more states of execution of the plurality of activities that represent completion of the workflow; and
        a scheduling module configured to, prior to initial execution of the workflow by the processor, develop an optimized execution plan for executing the workflow and to achieve the completion condition, comprising:
            identifying the plurality of activities of the workflow that could be executed to satisfy the completion condition, the plurality of activities including a first activity and a second activity that could be alternatively executed to satisfy the completion condition, at least in part; and ordering one or more activities from the plurality of activities into the execution plan and assigning system resources based on an analysis of activities in the plurality of activities and the completion condition, including ordering the first activity into the exclusion plan to the exclusion of the second activity based on the analysis preferring the first activity over the second activity for satisfying the completion condition.

17. In a computing environment comprising a workflow runtime, a computer readable storage device comprising computer executable instructions configured to optimize workflow execution, the computer readable storage device comprising:

computer executable instructions that when executed by a processor are configured to perform a critical path analysis based on identifying one or more completion conditions defining one or more states of execution of a plurality of activities of a workflow that represent completion of the workflow; and computer executable instructions that when executed by the processor are configured, prior to initially executing the workflow, to develop an optimized execution plan for executing the workflow to achieve the one or more completion conditions, comprising:

identifying the plurality of activities of the workflow that could be executed to satisfy the one or more completion conditions, the plurality of activities including a first activity and a second activity that could be alternatively executed to satisfy the one or more completion conditions, at least in part; and ordering an optimized set of activities from the plurality of activities into the optimized execution plan and assign system resources based on an analysis the plurality of activities and the one or more completion conditions, including ordering the first activity into the optimized exclusion plan to the exclusion of the second activity based on the analysis preferring the first activity over the second activity for satisfying the one or more completion conditions; and computer executable instructions that when executed by the processor are configured, subsequent to developing the optimized execution plan, to execute the workflow according to the optimized execution plan.

18. The computer readable storage device of claim 17, further comprising:

computer executable instructions that when executed by the processor are configured to analyze feedback from executing activities and to modify the optimized execution plan according to the feedback.

19. The computer readable storage device of claim 17, wherein the computer executable instructions that when executed by the processor are configured to perform the critical path analysis, are configured to evaluate system hardware that the workflow will be executing on.

20. The computer readable storage device of claim 17, wherein the computer executable instructions that when executed by the processor are configured to evaluate data provided by a developer of an activity.

21. The computer readable storage device of claim 17, wherein the computer executable instructions that when executed by the processor are configured to evaluate activities in a workflow that has already executed.

* * * * *

UNITED STATES PATENT AND TRADEMARK OFFICE
CERTIFICATE OF CORRECTION

| | | |
|---|---|---|
| PATENT NO. | : 8,108,868 B2 | Page 1 of 1 |
| APPLICATION NO. | : 11/958758 | |
| DATED | : January 31, 2012 | |
| INVENTOR(S) | : Stephen Toub et al. | |

It is certified that error appears in the above-identified patent and that said Letters Patent is hereby corrected as shown below:

In column 5, line 58, in Claim 4, after "activity" insert -- and --.

Signed and Sealed this
Twenty-seventh Day of March, 2012

David J. Kappos
*Director of the United States Patent and Trademark Office*